(12) United States Patent
Wohlleb

(10) Patent No.: US 8,794,928 B2
(45) Date of Patent: Aug. 5, 2014

(54) CANOPY FOR A WIND TURBINE NACELLE

(75) Inventor: Matthias Wohlleb, Aachen (DE)

(73) Assignee: Siemens Aktiengesellschaft, München (DE)

( * ) Notice: Subject to any disclaimer, the term of this patent is extended or adjusted under 35 U.S.C. 154(b) by 673 days.

(21) Appl. No.: 13/078,229

(22) Filed: Apr. 1, 2011

(65) Prior Publication Data

US 2011/0243726 A1    Oct. 6, 2011

(30) Foreign Application Priority Data

Apr. 6, 2010    (EP) .................................... 10159129

(51) Int. Cl.
*F03D 11/00*    (2006.01)

(52) U.S. Cl.
USPC .................................................... 416/244 R

(58) Field of Classification Search
CPC .................................................... F03D 11/005
USPC ......................................... 416/244 R; 52/40
See application file for complete search history.

(56) References Cited

U.S. PATENT DOCUMENTS

| | | | |
|---|---|---|---|
| 2008/0069684 A1* | 3/2008 | Ihle ............................... | 415/4.5 |
| 2009/0297332 A1 | 12/2009 | Boyd | |

FOREIGN PATENT DOCUMENTS

| | | | |
|---|---|---|---|
| CN | 101004168 A | | 7/2007 |
| CN | 100513778 C | | 7/2009 |
| CN | 101558236 A | | 10/2009 |
| DE | 103 40 560 A1 | | 4/2005 |
| DE | 10 2006 001 931 A1 | | 7/2007 |
| DE | 102006001931 A1 | * | 7/2007 |
| DE | 102008027498 A1 | | 12/2009 |
| FR | 2 927 952 A1 | | 8/2009 |
| FR | 2 940 360 A1 | | 6/2010 |
| WO | WO 2006032237 A2 | | 3/2006 |
| WO | WO 2007/132408 A2 | | 11/2007 |
| WO | WO 2007132408 A2 | * | 11/2007 |

OTHER PUBLICATIONS

"Alternative Fahrzeugkarosserien—Entwicklung eines Stahl-Space-Frame-Konzepts", Automobiltechnische Zeitschrift—ATZ 10, Jahrgang, Oct. 2008, pp. 878-883.

* cited by examiner

*Primary Examiner* — Richard Edgar

(57) ABSTRACT

A canopy for a wind turbine nacelle is provided. The canopy includes a frame made of bars and covering plates. The frame is self supporting, the bars are made of metal, and the covering plates are made of a material that comprises a polymer material and/or a sandwich material comprising a metal foam.

19 Claims, 4 Drawing Sheets

CANOPY FOR A WIND TURBINE NACELLE

CROSS REFERENCE TO RELATED APPLICATIONS

This application claims priority of European Patent Office application No. 10159129.5 EP filed Apr. 6, 2010, which is incorporated by reference herein in its entirety.

FIELD OF INVENTION

The present invention relates to a canopy for a wind turbine nacelle which comprises a frame made of bars and covering plates.

BACKGROUND OF INVENTION

A canopy for a nacelle of a wind turbine comprising a frame and covering elements held by the frame is disclosed in DE 10 2006 001 931 A1. The frame and the covering plates are curved to increase stability against forces acting from the outside of an assembled canopy and made from sandwich structures without core. Whether the frame is self-supporting or not is not mentioned.

Space frame concepts, in which self supporting frames and covering plates without supporting function are used, are known from the automotive industry. In the article "Alternative Fahrzeugkarosserien-Entwicklung eines Stahl-Space-Frame-Konzepts", published in Automobiltechnische Zeitschrift-ATZ 110. Jahrgang, Oktober 2008, pp 878-883 discloses a space frame design for motorised vehicle bodies with a self supporting frame of aluminium or steel. Plates with a none supporting character are mounted to the frame. In case of an aluminium space frame design, the frame is executed with profiles made by a bar extrusion process. Profiles used in a space frame made of steel are manufactured by a hydro forming process.

SUMMARY OF INVENTION

With respect to the mentioned prior art it is an objective of the present invention to provide an advantageous canopy for a wind turbine nacelle and to provide an advantageous wind turbine nacelle.

The first objective is solved by a canopy for a wind turbine nacelle as claimed in the claims and the second objective is solved by a wind turbine nacelle as claimed in the claims. The depending claims contain further developments of the invention.

An inventive canopy for a wind turbine nacelle comprises a frame made of bares and covering plates. The bars are made of metal, for example steel or aluminium. In particular, if aluminium is used a very lightweight canopy can be achieved.

According to the invention, the frame is self supporting. Moreover, the covering plates of the inventive canopy can be made of a material that comprises a polymer material and/or that comprises a sandwich material comprising a metal foam. In particular at least one of the covering plates is made of a material that comprises a structured polymer material which structuring provides for a higher stiffness than unstructured polymer material. In a space frame made of aluminium bars, the bars of the space frame can be connected by functional shapes, as nodes, which are made of aluminium pressure die casting. The functional shapes make form closure possible. The die cast nodes and the aluminium bars can be put into form closure and glued additionally. Steel bars of a space frame can be connected by different welding processes or by die casted nodes. In general the bars and/or nodes can be connected to each other by form closure, screw connections, glue connections or weld connections, etc.

By providing a self supporting frame, a so called space frame, made of metal it becomes possible to provide a stable and at the same time light weight canopy. As compared to the canopy disclosed in DE 10 2006 001 931 A1 neither the frame nor the covering plates need to be curved to achieve the stability of the canopy.

In case of the bars being made of aluminium they may be formed by an extrusion process (extruded aluminium bars). On the other hand, if the bars are made of steel they can be made by a hydro forming process (hydro formed steel bars).

Extruded aluminium bars offer the advantage that higher durability of the bars can be expected. This comes from the fact that no welding process is needed to connect the bars to each other or to connect the covering plates to the bars. As a consequence, there are neither flanges for the welding connection nor room for the welding devices needed. By the bar extrusion contact patterns of different designs can be created. For example, functionalities can be integrated into the bars, e.g. screw shapes, holes for bolts or harpoon beams. Harpoon beam shapes can be used to connect the aluminium bars with sealing devices of rubber or bushings. It is also possible to provide aluminium bars with different wall thicknesses within one and the same bar by using the extrusion process for forming the aluminium bars.

In case the space frame is made of steel bars the bars may be formed by a hydro forming process. Hence, the bars can be made of a hollow shape and a complex geometry by means of single process. The process goes fast and with a high process safety. The number of contact patterns and the number of single parts can be reduced on the one hand. On the other hand, a high shape quality can be reached next to a homogeneous durability by a cold-hardening process. There is a high light-weight construction potential. A draw back, as compared to extruded aluminium bars is the great effort on bending as a preparation of the hydro forming process.

To summarize, hydro formed steel bars as well as extruded aluminium bars can be connected by nodes. In case of the aluminium bars the nodes may either be die casted or formed by functional shapes of the bars themselves. In case of steel bars the nodes can be die casted.

According to the present invention, at least one covering plate of the canopy may be made of a material that comprises polyamide and/or polycarbonate and/or a sandwich material containing aluminium foam. In particular, at least one of the covering plates may consist of a polyamide material and/or at least one of the covering plates may consist of a polycarbonate material and/or at least one of the covering plates may consist of a sandwich material containing aluminium foam. In particular, covering plates made from polymer materials show no corrosion. If a higher stiffness is needed, the plates made of a sandwich material containing aluminium foam can be used. Alternatively, polycarbonate or polyamide plates with a structure shape can be used to increase stiffness.

The bars of the space of frame and the covering plates can be glued together. Additionally or alternatively, in case of the bars being made of aluminium, the covering plates may be connected to the bars by form closure, e.g. by using harpoon beams. Hence, in both cases no welding process for connecting the covering plates to the space frame is needed. As a consequence, the assembly process of the canopy is easy to accomplish and safe to handle.

Joining elements may be integrated into the covering plates and/or into the bars. Moreover, the covering plates may comprise integrated applications like seals, in particular sprayed seals, lights, hatches, lockings, etc.

According to a further aspect of the present invention, a wind turbine nacelle with an inventive canopy is provided. The advantages of such a nacelle follow directly from the advantages discussed with respect to the inventive canopy.

BRIEF DESCRIPTION OF THE DRAWINGS

Further features, properties and advantages will become clear from the following description of an embodiment in conjunction with the accompanying drawings.

DETAILED DESCRIPTION OF INVENTION

Figure 1:
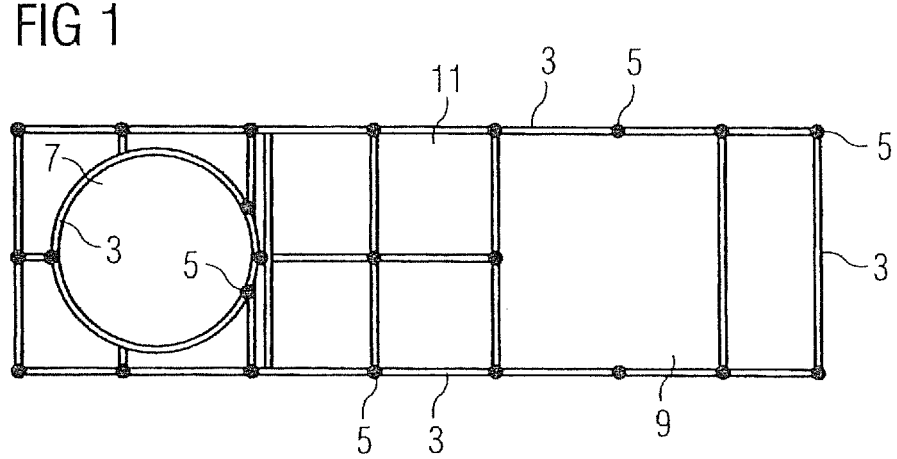
FIG. 1 shows the space frame of an embodiment of the inventive canopy in a bottom view.
Figure 2:
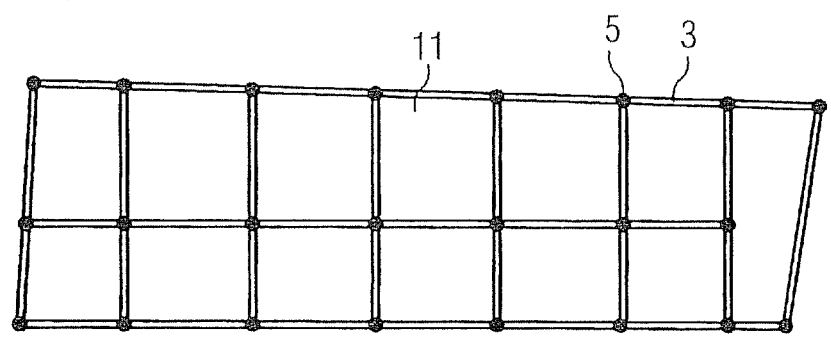
FIG. 2 shows the space frame of FIG. 1 in a side view.
Figure 3:
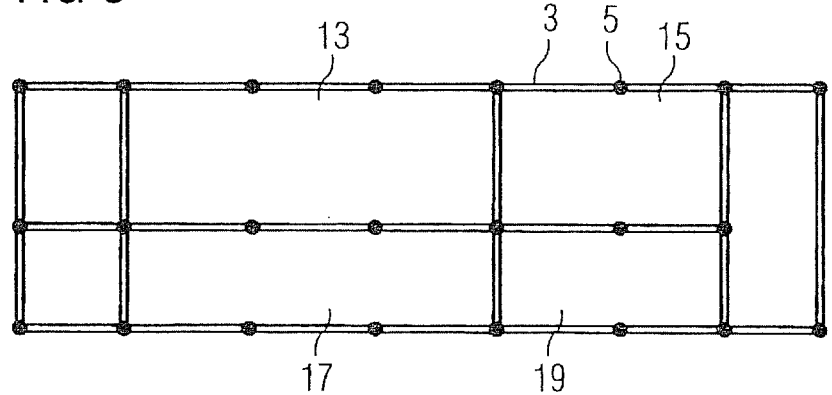
FIG. 3 shows the space frame of FIG. 1 in a top view.
Figure 4:
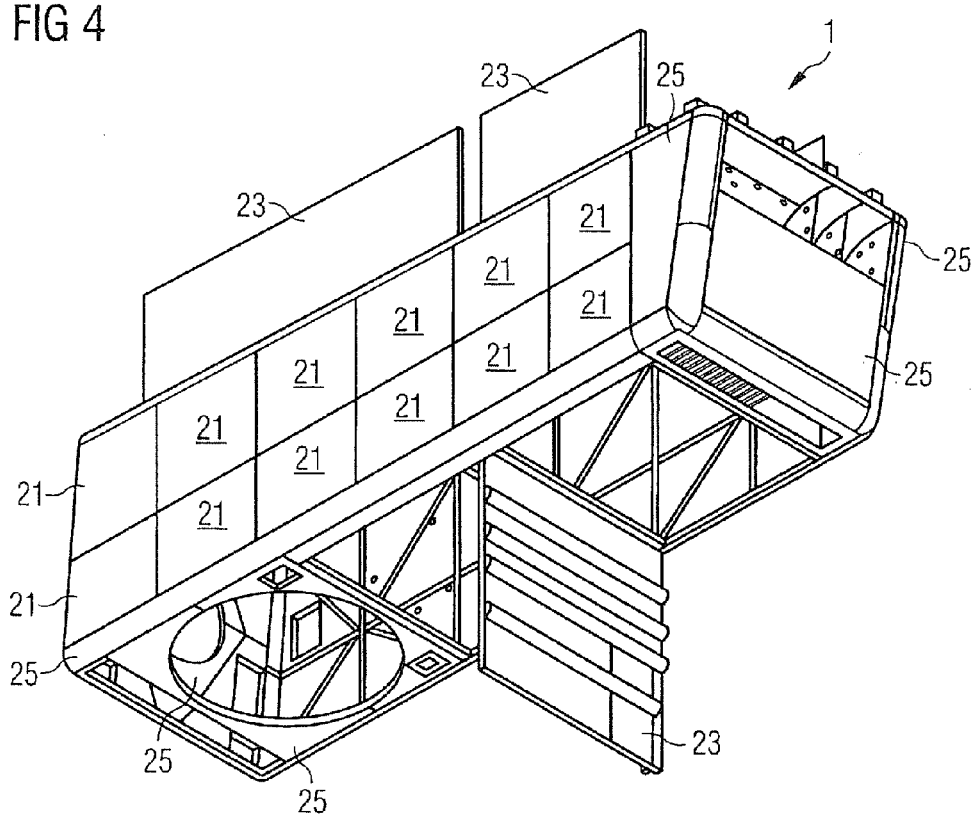
FIG. 4 shows the canopy of FIG. 1 with covering plates attached to the space frame in a perspective view.

An exemplary embodiment of an inventive canopy for a wind turbine nacelle will now be described with respect to the Figures. FIGS. 1 to 3 show the space frame of the canopy 1 in a bottom view (FIG. 1), a side view (FIG. 2) and a top view (FIG. 3), respectively. In these Figures, the bars 3 and nodes 5 making up the space frame are shown.

The bottom side of the space frame comprises a circular opening 7 for receiving a tower of a wind turbine. Moreover, the bottom side comprises a space frame segment 9 of larger dimensions than normal space frame segments 11. A normal space frame segment in the sense of the present invention is a space frame segment delimited by single space frame bars in each direction. Space frame segments of larger dimensions are formed by removing bars between neighbouring space frame segments 11 so that structures like the segment of larger dimensions 9 or similar segments of larger dimensions 13, 15, 17, 19 (compare the top view of FIG. 3) are fondled in the canopy. These structures are at least partly delimited by bars which are themselves assembled by at least two bars and a node between the two bars.

Figure 5:
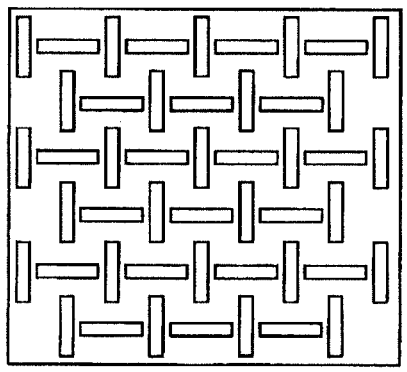
FIG. 5 shows a first design of a structured cover plate.
Figure 6:
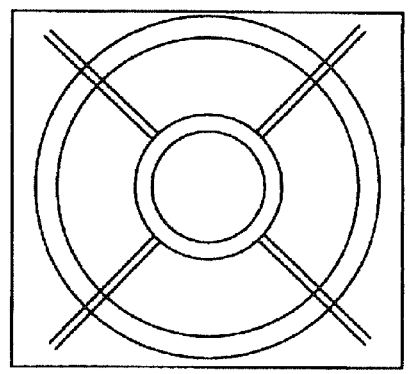
FIG. 6 shows a second design of a structured cover plate.

While, in the present embodiment, most of the normal space frame segments 11 are covered by polyamide plates 21 the space frame segments of larger dimensions, 9, 13, 15, 17, 19 are covered by polycarbonate plates 23. These polycarbonate plates comprise hinges so that they form hatches that can be opened, if necessary. In addition, in the present embodiment, the polycarbonate plates 23 are structured to increase their stiffness. To increase the stiffness of the plates 23, also the polyamide covering plates 21, can be provided with a structure. Two possible structures are exemplary shown in FIGS. 5 and 6.

Those areas of the canopy 1 where an even higher stiffness is needed, cover plates 25 made of a sandwich material containing a core of aluminium foam are used. Areas where a higher stiffness is needed are typically the area surrounding the opening 7 for the tower, the front side of the canopy, the back side of the canopy and the canopy etches.

Figure 10:
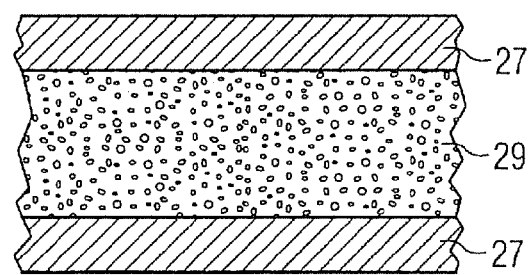
FIG. 10 shows a section through a covering plate made of a sandwich material.

In the present embodiment, the cover plates of the canopy consist of transparent polycarbonate hatches 23, polyamide plates 21 for covering the sides of the canopy frame and aluminium-sandwich-plates 25 which, in the present embodiment, consist of aluminium layers 27 with a layer 29 of aluminium foam in between (see FIG. 10). The connection between the aluminium layers and the foam can be achieved without gluing or welding.

The space frame bars 3 and the nodes 5 of the present embodiment are made from aluminium but can also be also made from other metals, in particular from steel. The aluminium bars are produced by an extrusion process, which is a very fast and safe process. Moreover, the extrusion process allows for freely designing shapes with functionalities for the aluminium bars. For example, notches, protrusions with or without hooks, screw shapes, holes for bolt connections, etc. can be created. The nodes 5 can be made by an aluminium pressure die casting process. Like the aluminium bars, the aluminium nodes can be provided with functional shapes, which makes a form closure between the nodes and the bars possible. In the present embodiment, the nodes and the bars are joint by such form closure. In addition, there also glued. However, a form closure or glued joint alone would as well be possible.

If the space frame bars and/or nodes are made from other metal than aluminium, for example from steel, the bars may either be connected directly, i.e. without the use of nodes, by welding, or they made be connected by using die casted steel nodes between the bars. Steel bars for the space frame can, for example, be produced by a hydro forming process which allows for hollow shapes and complex geometries by a single process. In addition, the hydro forming process goes fast and with a high process safety.

In addition to connecting the bars with each other for forming the space frame, there is also a connection needed for connecting the cover plates to the space frame, in particular to the bars of the space frame.

If the covering plates are made of a polymer material, like polyamide or polycarbonate, applications like, for example sealings and lights, or joining elements like, for example, holes, flanges, protrusions, notches, etc. can be integrated into the plates. In case of polycarbonate plates 23 forming hatches, hinges may be integrated into the hatches. The plates made from polyamide or polycarbonate, or other polymer materials, do not show corrosion like metal plates.

Figure 7:
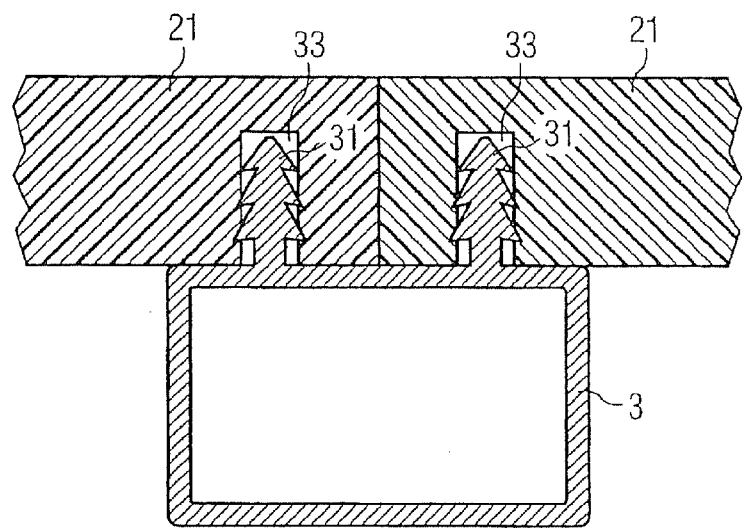
FIG. 7 shows a first kind of joints between space frame bars and cover plates.
Figure 8:
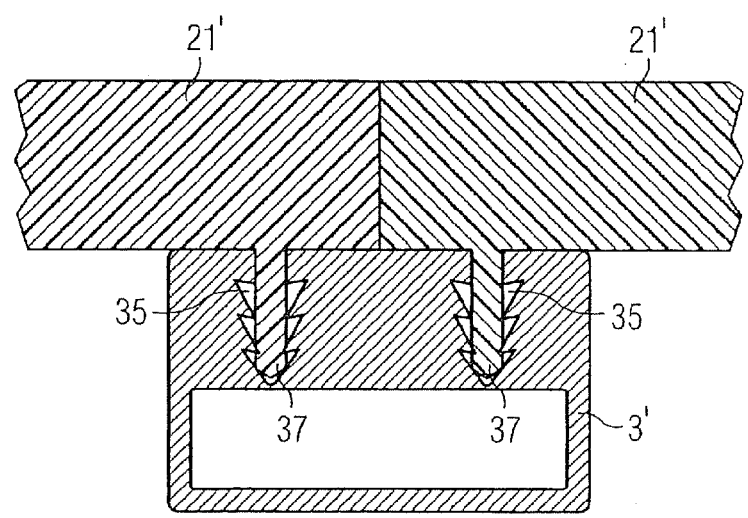
FIG. 8 shows a second kind of joints between space frame bars and cover plates.
Figure 9:
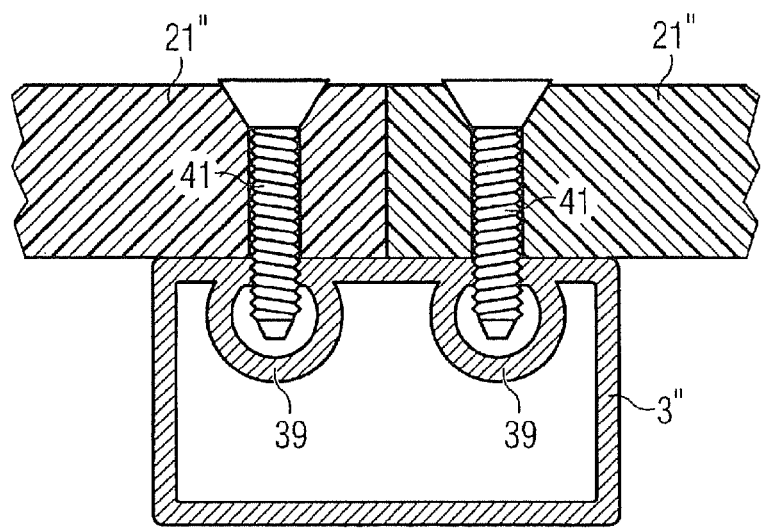
FIG. 9 shows a third kind of joints between space frame bars and cover plates.

Exemplary joints of plates with space frame bars 3 are shown in FIGS. 7 to 9. In all three Figures polyamide plates 21 are shown. However, polycarbonate plates 23 or, in some cases, sandwich plates with aluminium foam could be joint to the space frame bars 3 by the same means as shown in the Figures. In addition to the joining means shown in FIGS. 7 to 9 joining by glue joints is generally possible. Glue joints can also be present in addition to the joints shown in FIGS. 7 to 9.

FIG. 7 shows a space frame bar 3 with two harpoon beams 31 running along the length of the bar 3. The harpoon beams 31 are realised by protrusions with hooks, which can easily be formed by the extrusion process used for producing the aluminium bars 3 of the present embodiment. The cover plates 21 comprise integrated joining elements in form of notches 33 which can receive the harpoon beams 31 and which have slightly smaller width than the greatest width of the harpoon beams 31. The shape of the hooks is such that peak of the hooks shows away from the beam 3. In addition, the walls of the notches 33 integrated into the plates 21 may have the inverse shape of the hooks of the harpoon beams 31. Hence, the hooks do not hinder a movement of the harpoon beams 31 into the notches 33 of the cover plates 21. On the other hand, a movement of the harpoon beams out of the notches once they are inserted is hindered by the shape of the hooks. Hence, the hooks of the harpoon beams prevent the cover plates from moving away from the aluminium bar 3 once they are fixed to it.

FIG. 8 shows a structure which is inverse to the structure shown in FIG. 7. Instead of protrusions with hooks the aluminium bars 3' show notches the walls of which are equipped with hooks, and the cover plates 21' comprise integrated joining elements in faun of protrusions which can be inserted into the notches. The width of the protrusions is slightly larger than the distance between the peaks of the hooks located in the opposing notch walls so that a protrusion 37 of a cover plate 21' is secured against slipping out of the notch once it is inserted. In addition, the side walls of the protrusions 37 may have the inverse shape of the notch walls. Note that the wall thickness of the aluminium bar 3' is enlarged at the notch side of the bar. This can easily be achieved by the extrusion process described above.

A further alternative of fixing cover plates to aluminium bars is shown in FIG. 9. Here, the shown aluminium bar 3" is equipped with acceptances for screws, which can easily be formed by the extrusion process mentioned above. The cover plates 21" comprise through holes for receiving screws 41 that can be screwed into the acceptances 39.

In addition to the joints shown in FIGS. 7 to 9 further alternative joints are generally possible. For example, the bars 3 may be provided with flanges to which cover plates 21, 23, 25 could be fixed, e.g. by bolts, screws or nuts, etc. Moreover, welding processes are also possible. In this case, metal rims can be fixed to the cover plates which are then welded to the beams, in particular, if the beams are steel beams.

In case of the sandwich plates 25 with the aluminium foam, joining them to the bars 3 can be accomplished by bolts, by screws (e.g. as shown in FIG. 9), by gluing, or by a glue joint in combination with a form closure, e.g. provided by protrusion engaging proves.

The proposed design for a canopy of a wind turbine nacelle decreases expedition of efforts in assembling, transport and costs. In particular the aluminium bar extrusion process used for faulting the space frame bars is very fast and safe. In addition, also the hydro forming process for forming steel bars is fast and safe. The materials used in the present invention decrease the weight of the canopy without loss of stiffness and loading behaviour. Moreover, due to the reduced corrosion, the durability of the canopy and, hence, a nacelle equipped with such a canopy is increased.

The invention claimed is:

1. A canopy for a wind turbine nacelle, comprising:
a frame including a plurality of bars and a plurality of covering plates,
wherein the plurality of bars comprise metal,
wherein the plurality of covering plates includes a material that comprises a polymer material and/or a sandwich material comprising a metal foam, and
wherein the plurality of bars comprise aluminium and the covering plates are connected to the plurality of bars by form closure.

2. The canopy as claimed in claim 1, wherein the plurality of bars comprise extruded aluminium.

3. The canopy as claimed in claim 1, wherein the plurality of bars are connected by a plurality of nodes.

4. The canopy as claimed in claim 3, wherein the plurality of bars and/or the plurality of nodes are connected to each other by form closure, screw connections, glue connections or weld connections.

5. The canopy as claimed in claim 1, wherein at least one of the plurality of covering plates comprises a material that comprises a structured polymer material.

6. The canopy as claimed in claim 1, wherein at least one covering plate comprises a material that comprises polyamide and/or polycarbonate and/or a sandwich material comprising aluminium foam.

7. A canopy for a wind turbine nacelle, comprising:
a frame including a plurality of bars and a plurality of covering plates,
wherein the plurality of bars comprise metal,
wherein the plurality of covering plates includes a material that comprises a polymer material and/or a sandwich material comprising a metal foam, and
wherein the plurality of bars comprise aluminium and the plurality of covering plates are connected to the plurality of bars by a plurality of harpoon beams.

8. The canopy as claimed in claim 7, wherein the plurality of bars comprise hydro formed steel or extruded aluminium.

9. The canopy as claimed in claim 7, wherein the plurality of bars are connected by a plurality of nodes.

10. The canopy as claimed in claim 7, wherein the plurality of bars and/or the plurality of nodes are connected to each other by form closure, screw connections, glue connections or weld connections.

11. The canopy as claimed in claim 7, wherein at least one of the plurality of covering plates comprises a material that comprises a structured polymer material.

12. The canopy as claimed in claim 7, wherein at least one covering plate comprises a material that comprises polyamide and/or polycarbonate and/or a sandwich material comprising aluminium foam.

13. A canopy for a wind turbine nacelle, comprising:
a frame including a plurality of bars and a plurality of covering plates,
wherein the plurality of bars comprise metal,
wherein the plurality of covering plates includes a material that comprises a polymer material and/or a sandwich material comprising a metal foam, and
wherein the plurality of covering plates comprise a plurality of integrated joining elements.

14. The canopy as claimed in claim 13, wherein the plurality of bars comprise hydro formed steel or extruded aluminium.

15. The canopy as claimed in claim 13, wherein the plurality of bars are connected by a plurality of nodes.

16. The canopy as claimed in claim 13, wherein the plurality of bars and/or the plurality of nodes are connected to each other by form closure, screw connections, glue connections or weld connections.

17. The canopy as claimed in claim 13, wherein at least one of the plurality of covering plates comprises a material that comprises a structured polymer material.

18. The canopy as claimed in claim 13, wherein at least one covering plate comprises a material that comprises polyamide and/or polycarbonate and/or a sandwich material comprising aluminium foam.

19. A canopy for a wind turbine nacelle, comprising:
a frame including a plurality of bars and a plurality of covering plates,
wherein the plurality of bars comprise metal, wherein the plurality of covering plates includes a material that comprises a polymer material and/or a sandwich material comprising a metal foam, and wherein the plurality of covering plates comprise integrated applications.

* * * * *